Patented Mar. 8, 1938

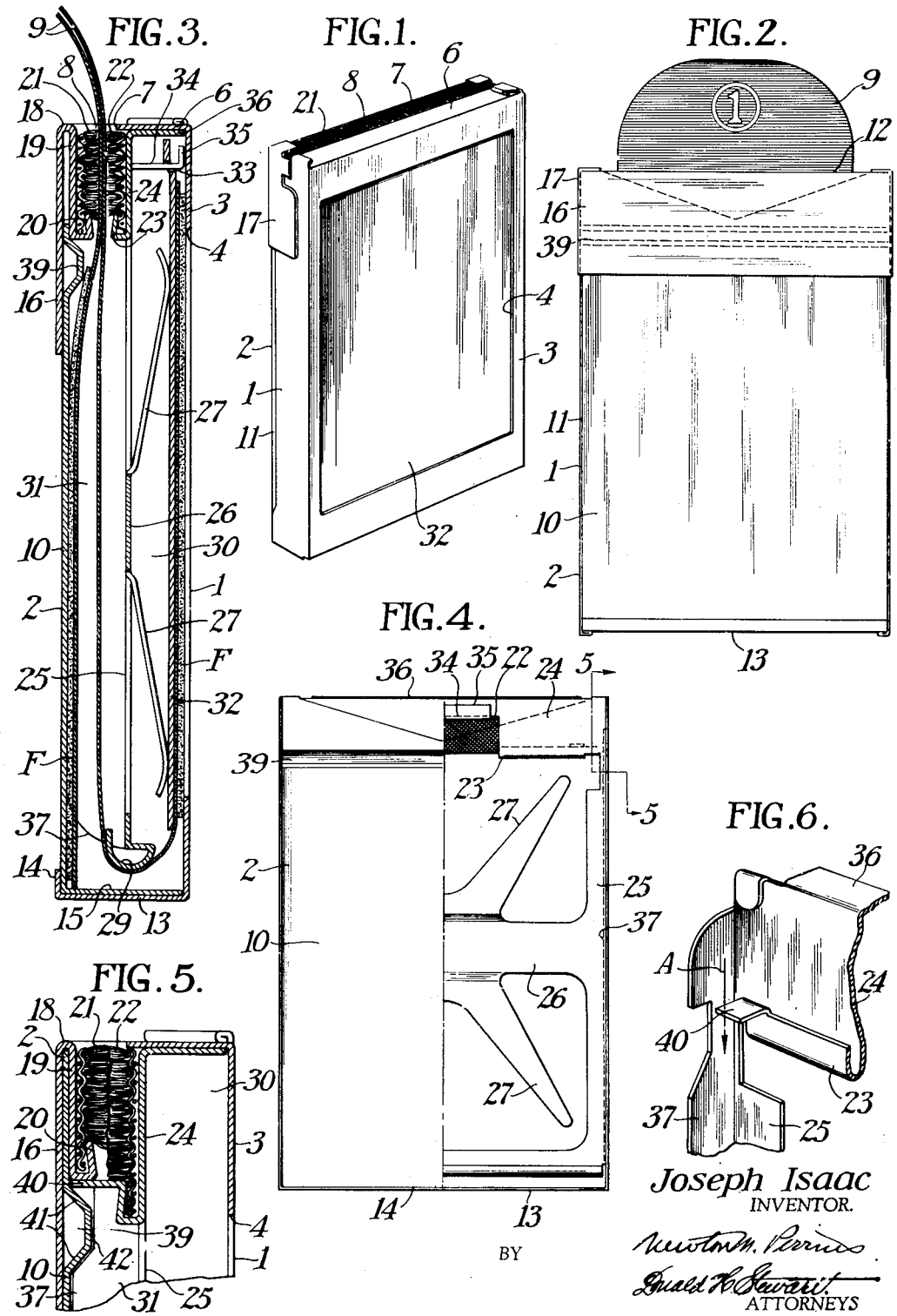

2,110,486

UNITED STATES PATENT OFFICE 2,110,486

FILM PACK CONSTRUCTION

Joseph Isaac, Rochester, N. Y., assignor to Eastman Kodak Company, Rochester, N. Y., a corporation of New Jersey Application May 29, 1937, Serial No. 145,505

8 Claims. (Cl. 95—22)

This invention relates to photography and particularly to film packs for holding a series of light-sensitive photographic films in a casing for exposure. One object of my invention is to provide an improved form of film pack casing in which the light trap between the casing members, through which the film pack tabs pass, is improved. Another object of my invention is to provide a film pack in which the center member which separates the pack into two chambers, one for exposed film and the other for unexposed film, is properly centered in the film pack and in which the bottom of the center septum is definitely spaced away from the bottom of the pack to facilitate moving films from one chamber to the other. Another object of my invention is to provide an exposed film chamber in which there is a light-protecting rib extending entirely across one of the film pack casing members, this member being adapted to prevent light from entering through the tab opening. Still another object of my invention is to provide a film pack casing with a formed up rib extending across one of the casing members, this rib adapted to position one of the light trapping members and lying beneath a flange on one of the light trapping members so that the smooth outside contour of the film pack may be preserved and other objects will appear from the following specification, the novel features being particularly pointed out in the claims at the end thereof.

This film pack is an improvement over the film pack shown in U. S. Patent 1,219,588, A. A. Rutan and C. E. Hutchings, granted March 20, 1917.

Coming now to the drawing wherein like reference characters denote like parts throughout, Fig. 1 is a perspective view of a film pack constructed in accordance with and embodying a preferred form of my invention.

Fig. 2 is a rear plan view of the film pack shown in Fig. 1.

Fig. 3 is an enlarged sectional view through a film pack constructed in accordance with my invention, the parts being shown purposely on an exaggerated scale and most of the films and film pack tabs being omitted for the sake of clearness.

Fig. 4 is a plan view of the rear casing member showing part of a septum in place to indicate the relation of the septum and rear film pack casing member.

Fig. 5 is an enlarged fragmentary sectional view taken on line 5—5 of Fig. 4 and Fig. 6 is an enlarged fragmentary perspective view of a portion of the septum before the light-locking material is added to the septum.

There has been considerable difficulty in excluding all undesirable light from metallic film packs due to the fact that when the metal is roughly handled it may become slightly distorted or bent from its original shape so that light is permitted to enter sometimes fogging the photographically light-sensitive films contained therein. This difficulty did not occur to such a great extent with the old cardboard or paper film packs because the vulnerable places were covered with pasters to exclude light. However, such pack suffered the disadvantage of not being sufficiently rigid to hold the film accurately in a focal plane. The present invention is particularly directed to overcoming the difficulties in known types of film packs.

In the drawing, I have illustrated a preferred embodiment of my invention in which the film pack casing may be made of two shallow box-like receptacles 1 and 2, the front section 1 of which is provided with a front wall 3 including an exposure frame 4, side walls 5 and a top wall 6 partially cut away at 7 to leave an opening 8 through which film pack tabs 9 may project as indicated in Figs. 2 and 3. The rear section 2 has an imperforate rear wall 10, side walls 11 and the top wall 12 is cut away to form the opposite side of a slot through which the film packs 9 may be drawn. The bottom wall 13 of casing section 1 is provided with an up-turned flange 14 so that the bottom wall 15 of casing section 2 may be held in place as indicated in Fig. 3.

Thus the two casing sections are both shallow box-like receptacles with their edge walls in contact, these two sections being held together by a removable locking flange 16 which extends down over a portion of the rear wall 10 of casing section 2 and which carries flanges 17 extending over portions of the side walls 5 as indicated in Fig. 1. Member 16 is bent upon itself at 18 so that the flange 19 may extend down inside of the slot 8 and a flange 20 is bent over on the lower edge of plush or pile material 21 to hold it in place. This pile material forms one side of a light-lock and the other side is formed of similar material 22 which fabric is held by a formed over flange 23 which, as indicated in Figs. 4 and 5, forms a portion of the upper portion 24 of the partition or septum which separates the film pack into two sections. This septum comprises a frame-like member 25 from which arms 26 extend inwardly to support four spring arms 27. The bottom layer 28 of the septum is bent into the shape of a semi-circle 29 as indicated in Fig. 3 so that the films F which are attached to the usual tabs 9 may be drawn around this curved member from the unexposed film chamber 30 on one side of the septum 2 to the exposed film chamber 31 on the opposite side of the septum.

In order to hold the films flat against the exposure frame 4, in position for exposure, there is a presser plate 32 engaged by the four spring arms 27 and thrusted thereby against the back of the backing paper supporting the films F in front of the exposure window.

Normally, such film packs carry twelve films, but for the sake of clearness, I have shown only one film with its backing paper in front of the exposure frame and only one film with its backing paper in the exposed film chamber 31. The presser plate 32 is slotted at 33 so as to slide on the supporting arm 34 carried by the top rail 24 of the septum frame 25 as indicated in Fig. 4. The end of this member is formed upwardly at 35 and the upper edge 36 of the rail 24 is bent parallel to the top wall 6 of the film pack casing so that it will locate the septum 25 from the front film pack section 1.

In order to locate the frame from the rear film pack casing section 2, and thus hold it in place, a pair of flanged rails 37 are provided as indicated in Fig. 6 these flanges being adapted to contact with the rear wall of the casing section 2. Thus the septum frame 25 is definitely located laterally of the film pack sections and it is also desirable to locate this septum longitudinally of the film pack sections.

This is done in the following manner: The rear film pack 2, as indicated in Figs. 3 and 4, is provided with a formed metal rib 39, this rib extending inwardly from one side wall of the casing to the other. It performs a number of useful functions.

First, this rib forms a support for the ears 40 bent from the top of flange 23 of the film pack septum as indicated in Figs. 5 and 6. These ears are adapted to engage the upper tapering wall 41 of the forming 39 which is preferably made with the slanting walls 41 extending inwardly and a flat wall 42 on the top end of the forming. This shape is convenient to make and can be made without perforating the end walls of the section 2 which of course would be undesirable.

Thus, since the ears 40 rest on the top of the forming 39, the lower rounded end 29 of the film pack septum is definitely spaced a fixed distance from the bottom walls 15 and 13 of the film pack section.

Second, the rib 39 greatly assists in rendering the slot 8 through which the film pack tabs project light-tight. The reason for this is that the lower end of the flange 19 which holds the pile material 21 for half of the light-lock is so positioned that it lies adjacent the upper edge of the forming 39 and thus any light which might pass between the flange 19 and the upper end of the rear wall of the casing section 2—which sometimes occurs at the extreme ends of the light lock—is prevented from passing downwardly into the exposed film chamber 31.

Thirdly, the forming 39 is spaced from the bottom walls of the casing sections 13 and 15 a distance somewhat less than the length of a film which has been exposed and has been drawn into the exposed film chamber 31 so that the films, after they have been exposed, lie in the position shown in Fig. 3 with the upper end of the films F spaced away from the rear film pack casing section a short distance near the rib 39. This tends to hold the films close together at the top and likewise tends to hold the film from beneath the flange 19 and the upper end of the film pack casing. The reason why this is advantageous is that if the flange member 16 should become slightly distorted, the tendency for light leak to occur is increased and when light does enter, it usually enters the extreme edges, the reason probably being that it is usually impossible to carry the flange 23 over to the extreme edge of the flanges 37 as shown in Fig. 6. Thus, light leakage would normally occur first in the direction shown by the arrow A in Fig. 6. This leakage of light, however, is completely eliminated by the forming 39 because this forming extends over to the extreme outside edges 11 of the film pack section 2.

In order to prevent the forming 39 from spoiling the smooth outside contour of the film pack, flange 16 is made long enough to cover the forming so that, as indicated in Fig. 2, this forming is not apparent when looking at the pack casing from the back as indicated in Fig. 2.

Thus the rib 39 serves a number of useful functions in the film pack construction and minimizes the possibilities of light leak through rough handling to such an extent that the film pack tab slot 8 can be said to be practically light-proof.

While I have illustrated and described a preferred embodiment of my invention, it is possible to change the dimensions and alter the relative positions and shapes of the various parts without departing from my invention as defined in the following claims.

What I claim is:

1. In a casing for film packs, the combination with a front section including a shallow box-like structure having an exposure frame therein, of a back section including a shallow box-like structure, the walls of the shallow box-like structure being adapted to engage each other when assembled, an embossing extending entirely across the back casing section, a light locking member comprising a strip of pile fabric, a metal member having a flange folded over on said pile fabric, the folded-over edge of said metal member lying adjacent the embossing extending across the film pack casing whereby a light-tight connection is provided.

2. In a casing for film packs, the combination with a front section including a shallow box-like structure having an exposure frame therein, of a back section including a shallow box-like structure, the walls of the shallow box-like structure being adapted to engage each other when assembled, an embossing extending entirely across the back casing section, a light locking member comprising a strip of pile fabric, the folded-over edge of said metal member lying adjacent the embossing extending across the film pack casing whereby a light-tight connection is provided, said flanged metal member having a second flange extending over the outside rear wall of the film pack and covering the embossing.

3. In a film pack, the combination with two inter-engaging shallow box-like members, of one having an exposure frame therein and both including a cut-away top wall to provide a film pack tab slot, a partition dividing the film pack into an exposed film chamber, and an unexposed film chamber, a plurality of films including backing papers and tabs mounted in the film pack casing, light locking members lining the tab slot through which film pack tabs project, and means for preventing exposed films from lying flat against the rear wall of the casing near the light-lock including a forming in the shallow box-like member extending across said member at the end provided with the light locking members.

4. In a film pack, the combination with two inter-engaging shallow box-like members, of one having an exposure frame therein and both including a cut-away top wall to provide a film pack tab slot, a partition dividing the film pack into an exposed film chamber, and an unexposed film chamber, a plurality of films including backing papers and tabs mounted in the film pack casing, light locking members lining the tab slot through which film pack tabs project, and means for preventing exposed films from lying flat against the rear wall of the casing near the light-lock including a forming in the shallow box-like member extending across said member at the end provided with the light locking members, said forming being spaced from an end of the film pack a distance less than the length of a film whereby a film lying in the exposed film chamber may be spaced from the rear wall of the film back.

5. In a casing for film packs, the combination with front and rear sections each in the shape of shallow box-like structures, the front section including an exposure frame and both sections including an end with cut-away portions forming a film pack tab slot, light trapping members on each side of the slot through which the tabs pass, the rear section including a formed rib projecting inwardly just beneath one of said light trapping members and extending across the entire width of the rear section, and forming with said light trapping member an additional means of excluding light from the interior of the film pack casing.

6. In a casing for film packs, the combination with front and rear sections each in the shape of shallow box-like structures, the front section including an exposure frame and both sections including an end with cut-away portions forming a film pack tab slot, light trapping members on each side of the slot through which the tabs pass, the rear section including a formed rib projecting inwardly just beneath one of said light trapping members, said rib including oppositely slanting walls terminating in a flat top and extending across the entire width of the rear section, and forming with said light trapping member an additional means of excluding light from the interior of the film pack casing.

7. In a casing for film packs, the combination with a front section including a shallow box-like structure, having an exposure frame therein, of a back section including a shallow box-like structure, the walls of the shallow box-like structures being adapted to engage each other when assembled, an embossing extending entirely across the back casing section, a septum dividing the casing into an exposed film chamber and an unexposed film chamber, a formed over-edge on the lower end of said casing about which the films may be drawn from one chamber to the other and means for spacing said formed over-edge from the end walls of the casing comprising a pair of spaced lugs adapted to engage portions of said embossing extending across the back casing section.

8. In a casing for film packs, the combination with a front section including a shallow box-like structure, having an exposure frame therein, of a back section including a shallow box-like structure, the walls of the shallow box-like structures being adapted to engage each other when assembled, an embossing extending entirely across the back casing section, a septum dividing the casing into an exposed film chamber and an unexposed film chamber, a formed over flange on the septum adapted to contact with the front wall section of the film pack casing, a pair of spaced lugs adapted to contact with the formed up embossing on the rear film pack casing section, whereby said septum is located both transversely and longitudinally of the casing.

JOSEPH ISAAC.